United States Patent [19]

Basham

[11] 4,266,395
[45] May 12, 1981

[54] APPARATUS TO PERMIT AND CONTROL TILTING OF THE HEADER PORTION OF A COMBINE RELATIVE TO THE THROAT PORTION THEREOF ABOUT THE AXIS OF FORWARD TRAVEL OF THE COMBINE

[75] Inventor: Carl G. Basham, Cowgill, Mo.

[73] Assignee: Thomas W. Basham, Excelsior Springs, Mo. ; a part interest

[21] Appl. No.: 55,602

[22] Filed: Jul. 9, 1979

[51] Int. Cl.³ .............................................. A01D 75/28
[52] U.S. Cl. ........................................ 56/209; 56/16.2
[58] Field of Search .................... 56/209, 208, 16.2, 2, 56/15.8, 15.6

[56] References Cited
U.S. PATENT DOCUMENTS

| 2,762,185 | 9/1956 | Hyman et al. | 56/209 |
| 2,904,949 | 9/1959 | Bell | 56/209 |
| 2,947,134 | 8/1960 | Clifford et al. | 56/209 |

Primary Examiner—Jay N. Eskovitz
Attorney, Agent, or Firm—Schmidt, Johnson, Hovey & Williams

[57] ABSTRACT

The header or platform of a harvesting machine such as a combine is tiltable laterally relative to the throat of the combine about a lower, fore-and-aft extending pivot located adjacent a normally lower, forwardmost section of the throat so that variations in ground contour between opposite lateral ends of the header can be accommodated. A hydraulic piston-and-cylinder unit provides remotely operable, powered tilting, and a special adapter assembly renders existing combines having non-tilting headers capable of achieving the aforementioned header tilt. One tubular component of the assembly is adapted to be detachably mounted onto the throat while the other tubular component of the assembly is adapted to be detachably mounted onto the header, there being a lower pivot between the two components providing the relative rocking therebetween to present the desired tiltability of the header relative to the throat.

13 Claims, 8 Drawing Figures

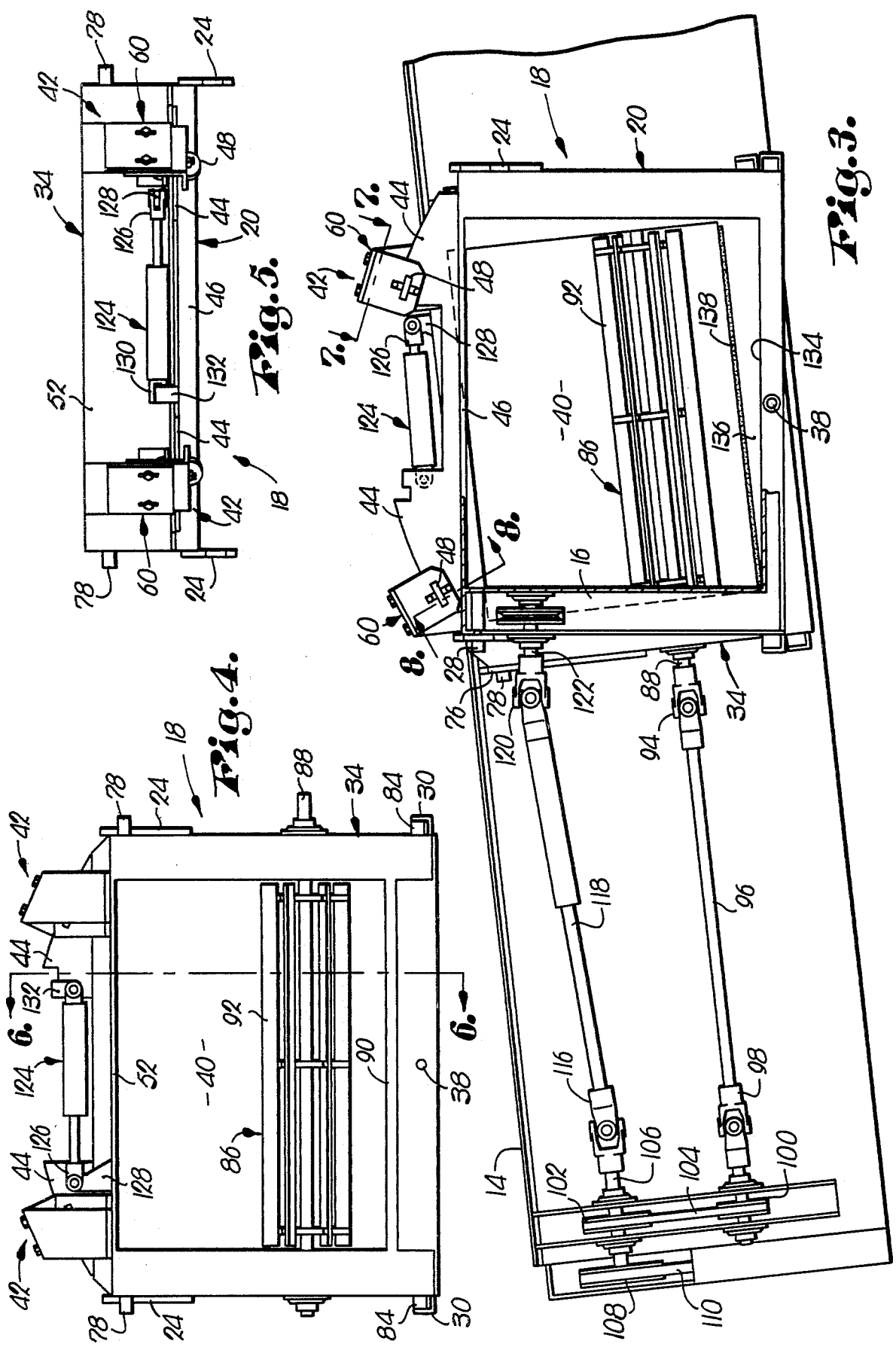

APPARATUS TO PERMIT AND CONTROL TILTING OF THE HEADER PORTION OF A COMBINE RELATIVE TO THE THROAT PORTION THEREOF ABOUT THE AXIS OF FORWARD TRAVEL OF THE COMBINE

TECHNICAL FIELD

This invention relates to the harvesting arts and, more particularly, to a harvesting header of a combine or the like which can be tilted laterally with respect to a generally fore-and-aft axis so that the header can accommodate changes in ground contours experienced between opposite lateral ends of the header.

BACKGROUND ART

Harvesting headers such as those utilized on combines have become increasingly large in recent years in order to promote harvesting efficiencies by diminishing the number of passes the operator must make across a field. By increasing the length of such headers, the width of swath taken by the combine as it moves across the field is correspondingly increased. At the same time, however, the increased length of such headers increases the likelihood that the ground contour adjacent one end of the header will not be the same as that at the opposite end. Moreover, the wheels on one side of the tractor of the combine may run in a furrow while the wheels on the opposite side may run along a ridge, for example. If the header cannot be tilted transversely about a fore-and-aft axis under such circumstances, one lateral end of the header will be dropped down while the opposite lateral end will be raised up as the tractor tilts down on one side.

This type of action can be particularly unacceptable where a crop such as soybeans is being harvested since, in that circumstance, the plants must be severed virtually directly at ground level in order to be assured that a maximum harvesting of the ground-level bean pods is obtained. As is apparent, if one end of the header is raised up because the opposite side of the combine is traveling in a furrow, many beans will be missed at the raised end because the plants will simply be severed too high off the ground.

Various so-called "sidehill combines" are presently available on the market in which the headers can be tilted relative to the throat portions of the machines. However, to be best of my knowledge, all of such sidehill machines are arranged so that the header swings about a pivot that is located along the top of the throat as opposed to the bottom thereof as in the present invention. Moreover, to my knowledge there is no present arrangement for converting machines with non-tilting headers into tilting header machines according to the concepts of the present invention.

SUMMARY OF THE PRESENT INVENTION

Accordingly, one important object of the present invention is to provide a combine or the like in which the header thereof may be tilted in either of two lateral directions about a generally fore-and-aft pivot located adjacent the lowermost section of the receiving throat of the combine so as to obtain the significant benefits flowing from such a lower pivoting arrangement. As will be elaborated upon hereinafter, one such benefit resides in the fact that most crop material being transferred from the header to the combine throat travels along the lower extremity of that region. Because the pivot is located closely adjacent the primary crop flow, disalignment of the relatively rotatable, tubular components through which the crop flows during header tilting does not detract from smooth, even crop flow.

In further accordance with the concepts of the present invention, a pair of tubular adapter components are provided, one of which is adapted for quick detachable mounting onto the throat and the other of which is adapted for quick detachable mounting onto the header. The two components are rockably interconnected by a pivot adjacent their lower extremities which establishes general axial registration between the two components and provides for relative rocking movement therebetween so as to in turn permit the header to tilt laterally with respect to the throat. Special retaining means remote from the pivot adjacent the upper extremity of the throat assists in preventing axial separation of the components during rocking movement of the header to its tilted positions, and an auxiliary feeder is located within the passage defined by the two aligned components to augment feeding of crop material from the header into the throat. A flexible flap covers the joint adjacent the pivot point between the two components so as to additionally facilitate crop flow even during those times that the components are in a rocked condition relative to each other.

BRIEF DESCRIPTION OF THE DRAWINGS

FIG. 3 is a fragmentary, transverse, cross-sectional view through the throat portion of the combine taken substantially along line 3—3 of FIG. 2 but showing the header in one laterally tilted extreme position thereof;

FIG. 4 is an end elevational view of the adapter assembly of the present invention from the front thereof with the header of the combine removed;

FIG. 5 is a top plan view thereof;

DETAILED DESCRIPTION

Figure 1:
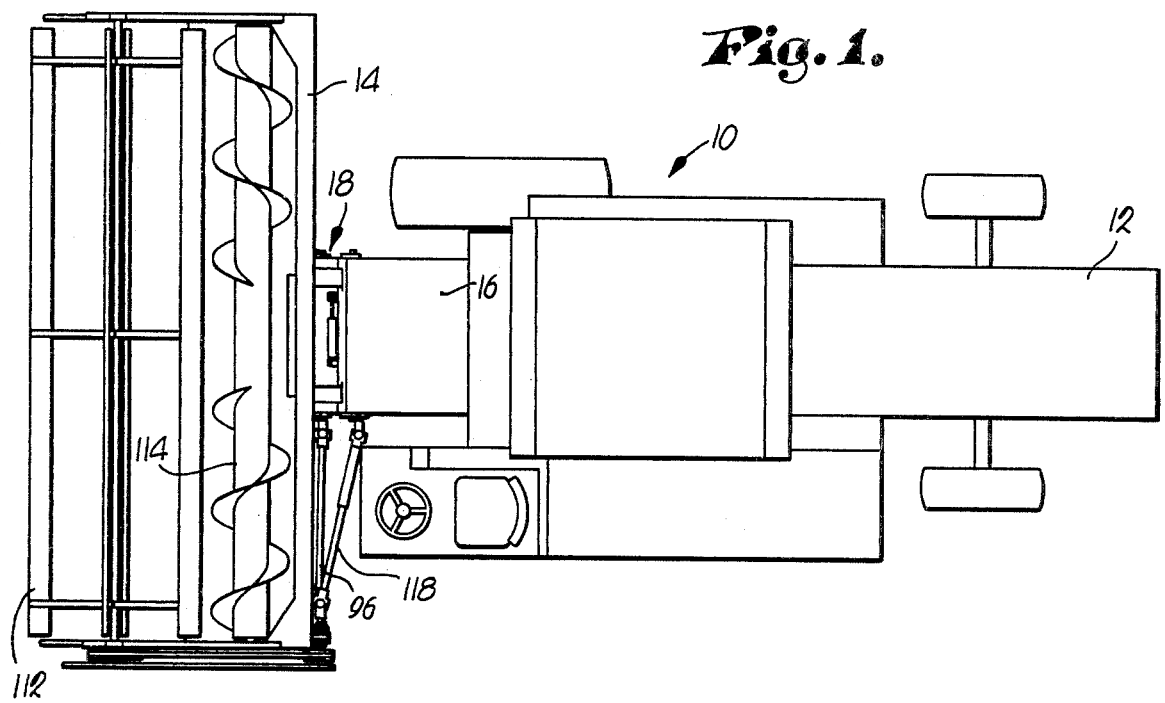
FIG. 1 is a schematic top plan view of a combine or like harvesting machine employing the principles of the present invention.

The harvesting machine 10 such as a combine includes a prime mover or tractor 12 adapted to receive harvested crop materials such as, for example, soybeans, to separate the stalks or "chaff" from the beans themselves, to discharge the chaff onto the ground, and to retain the beans in a suitable reservoir until such time as it is appropriate to unload the beans into an awaiting truck or the like. The harvesting header 14 comprising another portion of the combine 10 is spaced forwardly from the tractor 12 and is adapted for severing the crop materials from the ground, collecting such severed materials, and delivering the same rearwardly into a throat portion 16 of the combine 10 for conveyance through the latter into the tractor 12. Details of the tractor 12, the header 14, and the throat 16 will not be set forth herein in view of the fact that such structures may take several different forms, and such details are not germane per se to the principles of the present invention.

In accordance with the principles of the present invention, the combine 10 is provided with an adapter assembly broadly denoted by the numeral 18 located between the header 14 and the throat 16 and adapting the header 14 for lateral tilting movement in either of two opposite directions about a generally fore-and-aft axis relative to the normal path of travel of the combine 10. The adapter assembly 18 includes a first tubular component 20 having a rectangular, cross-sectional configuration. Opposite side members 22 of the component 20 are provided with upwardly and rearwardly projecting hooks 24 having downwardly opening notches 26 adapted to receive corresponding, laterally outwardly projecting pins 28 on the throat 16 such as to detachably mount the component 20 onto the throat 16. Sockets 30 at the bottom of the component 20 releasably receive forwardly projecting studs 32 on the throat 16 so as to further attach the component 20 to the throat 16, there being mechanism (not shown) in association with the sockets 30 and the studs 32 for locking the latter in place. The cooperating mounting means thus defined by the hooks 24, pins 28, sockets 30 and studs 32 are so disposed as to retain the component 20 in substantial axial registration with the throat 16 and to hold the component 20 against movement relative to the throat 16.

The adapter assembly 18 further includes a second tubular component 34 of transversely rectangular configuration. Components 20 and 34 are virtually identical, except for the fact that component 34 is wider, as seen from the side thereof, than the component 20.

Coupling means 36 in the nature of a pivot 38 is provided adjacent the lower extremities of the components 20 and 34 to pivotally interconnect those two structures for relative rocking movement about a generally fore-and-aft axis defined by the pivot 38. As illustrated in FIGS. 3 and 4, the pivot 38 is located in a symmetrical position with respect to the opposite sides of the adapter assembly 18 and, because of its low disposition, is positioned below the crop delivery passage 40 defined interiorally of the components 20 and 34 as a result of their tubular natures.

Figure 8:
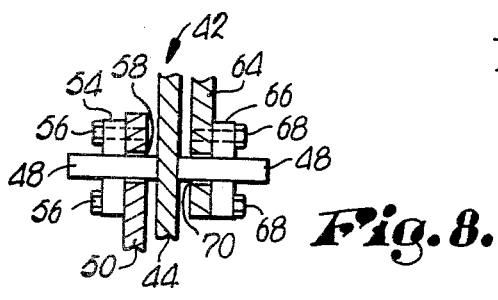
FIG. 8 is a fragmentary, enlarged, cross-sectional view of the other retainer taken substantially along line 8—8 of FIG. 3.
Figure 7:
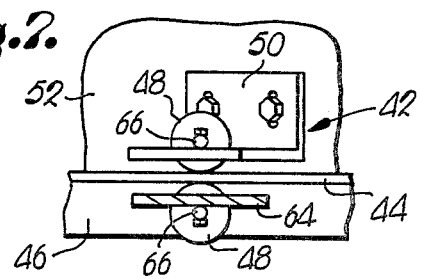
FIG. 7 is a fragmentary, enlarged, cross-sectional view of one of the retainers for the two components of the adapter assembly, said view being taken along line 7—7 of FIG. 3.

The coupling means 36 is operable to locate the components 20 and 34 in general axial registration with one another and is also operable to retain such components against axial separation along the lower extremities thereof. Additional retaining means denoted broadly by the numeral 42 is located remote from the coupling means 36 along the top extremities of the components 20,34 for assisting in holding the latter against axial separation without adversely affecting the ability of the component 34 to rock about the pivot 38 relative to the component 20. In this regard, the retaining means 42 includes a pair of laterally spaced, upstanding plates 44 on the top, transverse member 46 of the component 20, such plates 44 being edgewise aligned in the same transverse plane across the adapter assembly 18. Each of the plates 44 is clamped between a pair of corresponding roller wheels 48 that are in turn carried by the other component 34 such that, in effect, the component 34 is attached at the top to the component 20 via the plates 44 and the roller wheels 48. One of the roller wheels 48 of each plate 44 is carried by an upstanding, generally L-shaped lug 50 on the top member 52 of the component 34, said arrangement being illustrated in detail in FIG. 8. As seen in that figure, the lug 50 has a generally upright pivot unit 54 for the roller wheel 48 attached via screws 56 to one side thereof such that the axis of rotation of the roller wheel 48 is similarly located on the front side of the lug 50, the latter also having a slot 58 through which the roller wheel 48 may project into abutting contact with the proximal face of the plate 44.

Figure 2:
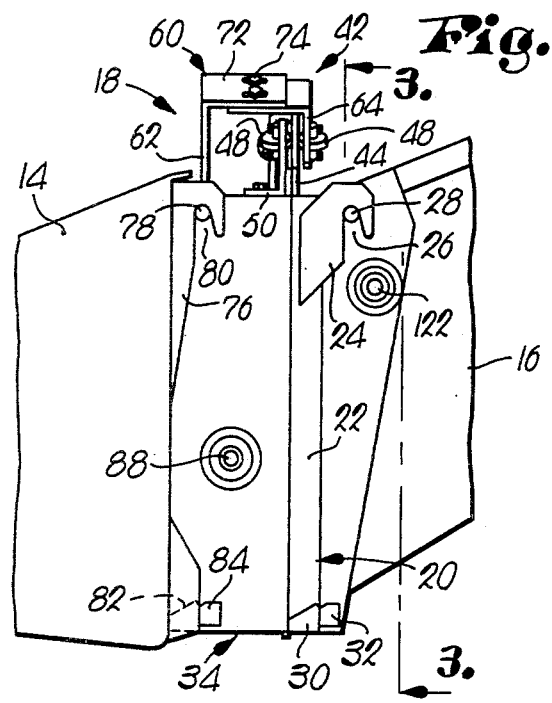
FIG. 2 is a fragmentary, enlarged side elevational view of the combine showing in particular the adapter assembly located between the header and the throat portions thereof.

The other roller wheel 48 of each pair thereof is somewhat similarly mounted on inverted, generally U-shaped bracket 60 having one leg 62 thereof rigid to the top member 52 of component 34 and a depending, opposite leg 64 thereof positioned rearwardly of the corresponding, proximal plate 44. A pivot unit 66 on the leg 64 adapts the corresponding roller wheel 48 for rotation about a generally upright axis, the unit 66 being attached to the rear side of the leg 64 by screws 68 such that the axis of rotation of the corresponding roller wheel 48 is correspondingly so located. A slot 70 in the leg 64 permits the roller wheel 48 to project through the leg 64 into abutting relationship with the proximal rear face of the corresponding plate 44. Note in FIG. 2 that the bight 72 of the U-shaped bracket 60 may be adjusted in length via a slot-and-bolt assembly 74 so as to permit adjustment of the clamping pressure applied by the roller wheels 48 against opposite faces of the corresponding plate 44.

The header 14 is provided with rearwardly projecting hooks 76 on opposite sides thereof which would normally be adapted to receive the pins 28 on the throat 16 but which, in accordance with the principles of the present invention, are instead adapted to receive cooperatively disposed, laterally outwardly projecting pins 78 on the component 34 adjacent the upper extremities thereof. A notch 80 in each of the hooks 76 opens downwardly so as to readily receive the corresponding pin 78. Rearwardly facing sockets 82 adjacent the lower extremities of the header 14 on opposite sides thereof are disposed to normally receive the forwardly projecting studs 32 of the throat 16 but, in accordance with the present invention, they are also adapted to receive similarly located, forwardly projecting studs 84 on the component 34. Suitable locking mechanism (not shown) may be utilized in connection with the sockets 82 and the studs 84 for releasably latching the two in interlocked engagement with one another. By virtue of this arrangement, it should be clearly apparent that the header 14 is firmly secured to the component 34 in such a way that there is no relative movement between the two.

Figure 6:
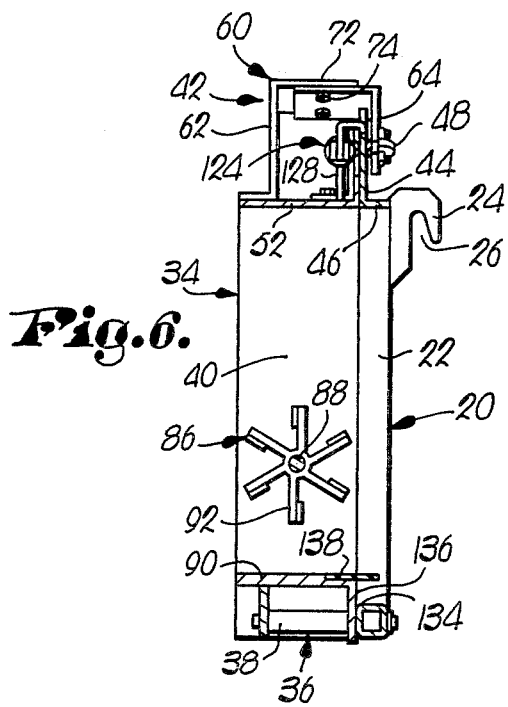
FIG. 6 is a cross-sectional view through the adapter assembly taken substantially along line 6—6 of FIG. 4.

As illustrated in particular in FIGS. 3, 4 and 6, a rotary feeder 86 is positioned within the passage 40 for the purpose of assisting in conveyance of crop materials from the header 14 through the adapter assembly 18 and into the throat 16. Preferably, the feeder 86 includes a transverse shaft 88 spaced above the bottom transverse member 90 of the component 34 and a plurality of circumferentially spaced paddles 92 rigidly affixed to the shaft 88 for rotation with the latter. As illustrated in FIG. 4 and also in FIG. 3, the shaft 88 projects outwardly beyond one side of the component 34 for connection to driving apparatus as will now be explained.

As illustrated in FIGS. 1 and 3, the projecting end of the shaft 88 of feeder 86 is provided with a U-joint 94 that is in turn connected to a drive shaft 96 extending along the backside of the header 14. At the outboard end of the shaft 96, a second U-joint 98 connects the latter to a driven sheave 100 drivingly coupled with an upwardly disposed sheave 102 via a belt 104. Sheave 102 is fixed to a short, transverse stub shaft 106 projecting in an outboard direction to an additional sheave 108 entrained by a belt 110 leading to driven parts of the header 14, i.e., the reel 112 shown in FIG. 1, a sickle (not shown) disposed beneath the reel 112, and a center-gathering auger 114.

At its inboard end, the stub shaft 106 is provided with a U-joint 116 that is in turn connected to a telescoping drive shaft 118 having a U-joint 120 at its inboardmost end located rearwardly adjacent the upper regions of the component 20. The U-joint 120 is in turn connected to a laterally outwardly projecting shaft 122 of the throat 16 which is driven by apparatus not shown.

Power for tilting the header 14 in either lateral direction about the axis of pivot 38 is provided by a hydraulic piston-and-cylinder unit 124 forming a further part of the adapter assembly 18 and situated on top of the components 20,34. In the illustrated embodiment, the ram end 126 of the unit 124 is attached to an upstanding lug 128 on the top member 52 of component 34, while the opposite cylinder end 130 of the unit 124 is attached to a downturned ear 132 of the proximal plate 44, said ear 132 extending transversely forwardly from the plate 44 across the line of intersection between the two components 20,34 such as to permit the unit 124 to interconnect components 20,34 without extending in an oblique disposition across such intersection between the components.

As illustrated perhaps most clearly in FIG. 6, the rearward component 20 has a stepped down, forwardmost edge 134 with respect to the proximal rearward edge 136 of the component 34. An elastomeric flap 138 spans the component 34 along said rear edge 136 thereof and projects beyond the same into overhanging relationship to the edge 134 of component 20 such as to provide a relatively smooth transition between components 20 and 34 in that location notwithstanding the angular disalignment of the two components during tilting of the header 14 relative to the throat 16.

OPERATION

Operation of the combine 10, and in particular the adapter assembly 18, should be apparent from the foregoing detailed description. Certain aspects may be elaborated upon, however, as follows.

As above explained, the harvesting parts of the header 14 are provided with driving power from the throat 16 via the telescoping drive shaft 118. Additionally, the feeder 86 within the component 34 of adapter assembly 18 is rotated in a counterclockwise direction viewing FIG. 6 by the drive shaft 96 which takes off power from the shaft 118 in the manner above described and as shown in FIG. 3. Consequently, crop materials that are gathered to the center of the header 14 by the auger 114 and are then delivered rearwardly to the passage 40 of adapter assembly 18 are acted upon by the feeder 86 to the extent necessary to insure continued flow of the crop materials into the throat 16, at which location additional conveying mechanism not shown takes over and moves the materials rearwardly into the tractor portion 12 of the combine for further processing.

Normally, the header 14 will be maintained in a level condition, substantially perpendicular to an upright plane through the tractor 12 and throat 16. However, if, for example, it is necessary or desirable for any reason to tilt the header 14, such may be immediately accomplished by actuating the piston-and-cylinder unit 124 to either extend or retract the same from its nominal position illustrated in FIGS. 4 and 5. If the unit 124 is contracted, the header 14, together with the front component 34, will swing in a counterclockwise direction viewing FIG. 3 about the axis of pivot 38. This attitude may be maintained along the full length of a crop row if necessary without adversely affecting the smooth flow of material from the header 14 into the throat 16.

This is particularly well shown by FIG. 3 wherein it may be seen that because the pivot 38 is disposed centrally along the bottom of the components 20,34 instead of along the top thereof, the corresponding lower regions of components 20,34 remain substantially registered with one another even though the components 20,34 are rotated with respect to each other. Since the bulk of crop material flow is indeed along the lower portion of the passage 40 as opposed to the top thereof, this becomes a significant feature insofar as promoting the smooth and uninterrupted flow of materials from the header 14 to the throat 16 is concerned.

Furthermore, the flap 138 is of assistance, as well as is the fact that the forwardmost edge 134 of the component 20 is stepped down with respect to the corresponding rearmost edge 136 of the component 34. Consequently, even during rather severe tilting of the header 14, no impediment to smooth crop flow is presented at the interface of the components 20 and 34.

It is also important to point out that the quick attach and quick detach nature of the header 14 is not sacrificed by the present invention. In this regard, note that the pins 78 and studs 84 associated with the front component 34 still permit the header 14 to be quickly installed and removed as may be necessary or desirable.

I claim:

1. In a harvesting machine having a receiving portion adapted for advancement along a certain path of travel across a field, a header portion spaced forwardly from said receiving portion and adapted for severing crop materials from the field during said advancement and collecting said severed materials, and a throat spanning the distance between said portions to provide a conduit through which the severed crop materials may be transferred from the header portion to said receiving portion, the improvement comprising:

a lower pivotal coupling between said throat and the header portion adapting the latter for lateral rocking movement about a generally fore-and-aft axis relative to said path of travel and located adjacent a normally lower section of said throat; and selectively operable power means between said throat and said header portion for effecting said rocking movement to the extent and in the direction necessary to permit accommodation of variations in ground contour between one lateral end of said header portion and the opposite lateral end thereof, said throat and said header portion being provided with an adapter assembly therebetween providing said coupling and said power means, said assembly including means releasably attaching the same to said throat and means releasably attaching the same to said header portion, said assembly including a pair of tubular components adapted for substantially axially aligned registration with one another so as to define a crop material passage therethrough, one of said components remaining with said throat during rocking of the header portion and the other of said components moving with said header portion during said rocking, said coupling including a pivot interconnecting said components.

2. In a harvesting machine as claimed in claim 1, wherein said components are provided with retaining structure remote from said pivot for holding said components against axial separation during said rocking.

3. In a harvesting machine as claimed in claim 1, wherein said passage is provided with a feeder therein adapted for engagement with crop material emanating from the header portion for assisting in delivery of material to said throat.

4. In a harvesting machine as claimed in claim 1, wherein said one component includes a normally lower end edge adjacent said other portion and stepped down with respect to a proximal normally lower end edge on said other component whereby to facilitate crop material flow between said components.

5. In a harvesting machine as claimed in claim 4, wherein said other component has a flap of elastomeric material projecting from said edge thereof into overhanging relationship with said edge of the one component.

6. For use with a harvesting machine having a crop-severing and collecting header, a throat for receiving severed crop materials from said header and transferring the same to a receiving portion of the machine, and cooperating means on the header and the throat detachably mounting said header on the throat, an adapter assembly for rendering said header tiltable relative to said throat about a generally fore-and-aft axis relative to the normal path of travel of the machine for accommodating variations in ground contour at opposite lateral ends of the header, said assembly comprising:
　a pair of tubular components;
　first mounting means on one of said components corresponding to the header portion of said cooperating means for detachable mounting of said one component on said throat in lieu of said header and in substantial axial alignment with the throat;
　second mounting means on the other of said components corresponding to the throat portion of said cooperating means for detachable mounting of said other component on said header in position to receive crop materials emanating therefrom;
　means pivotally coupling said other component to said one component in substantial axial alignment therewith and for rocking of said other component relative to said one component about an axis generally parallel to the path of crop flow therethrough; and
　selectively operable power means between said components for effecting said rocking thereof.

7. An adapter assembly as claimed in claim 6, wherein said coupling means includes a pivot extending between said components adjacent a normally lower section thereof.

8. An adapter assembly as claimed in claim 7, wherein said coupling means further includes retaining structure remote from said pivot for holding said components against axial separation during said rocking.

9. An adapter assembly as claimed in claim 6, wherein said components define a passage, said passage being provided with a feeder for assisting in the delivery of material to said throat from said header.

10. An adapter assembly as claimed in claim 6, wherein said one component includes a normally lower end edge adjacent said other portion and stepped down with respect to a proximal normally lower end edge on said other component whereby to facilitate crop material flow between said components.

11. An adapter assembly as claimed in claim 10, wherein said other component has a flap of elastomeric material projecting from said edge thereof into overhanging relationship with said edge of the one component.

12. An adapter assembly as claimed in claim 11, wherein said coupling means further includes retaining structure remote from said pivot for holding said components against axial separation during said rocking.

13. An adapter assembly as claimed in claim 12, wherein said components define a passage, said passage being provided with a feeder for assisting in the delivery of material to said throat from said header.

* * * * *